United States Patent
Saunders et al.

(10) Patent No.: US 9,555,846 B1
(45) Date of Patent: Jan. 31, 2017

(54) PELVIS STRUCTURE FOR HUMANOID ROBOT

(71) Applicant: Google Inc., Mountain View, CA (US)

(72) Inventors: John Aaron Saunders, Arlington, MA (US); Christopher Everett Thorne, Somerville, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/664,701

(22) Filed: Mar. 20, 2015

(51) Int. Cl.
| | | |
|---|---|---|
| *B62D 57/032* | (2006.01) | |
| *B25J 9/00* | (2006.01) | |
| *B25J 17/00* | (2006.01) | |
| *B25J 9/14* | (2006.01) | |

(52) U.S. Cl.
CPC ............ *B62D 57/032* (2013.01); *B25J 9/0006* (2013.01); *B25J 9/14* (2013.01); *B25J 17/00* (2013.01)

(58) Field of Classification Search
CPC ........ B62D 57/032; B62D 57/02; B25J 17/00; B25J 9/0006
USPC ......................................................... 180/8.6
See application file for complete search history.

(56) References Cited

U.S. PATENT DOCUMENTS

| | | | | |
|---|---|---|---|---|
| 5,159,988 A * | 11/1992 | Gomi | ........................ | B25J 9/06 180/8.1 |
| 6,089,950 A * | 7/2000 | Lee | .......................... | A63H 3/46 446/376 |
| 6,564,888 B1 * | 5/2003 | Gomi | ................... | B62D 57/032 180/8.6 |
| 6,583,595 B1 * | 6/2003 | Hattori | ................. | B62D 57/032 318/567 |
| 6,658,962 B1 * | 12/2003 | Rosheim | .............. | B25J 17/0275 74/490.05 |
| 6,902,015 B2 * | 6/2005 | Furuta | .................... | B25J 13/081 180/8.6 |
| 6,917,175 B2 | 7/2005 | Hattori et al. | | |
| 7,013,201 B2 * | 3/2006 | Hattori | ................. | B62D 57/032 180/8.1 |
| 7,057,367 B2 | 6/2006 | Furuta et al. | | |
| 7,072,740 B2 * | 7/2006 | Iribe | ...................... | G06N 3/008 180/8.1 |
| 7,076,338 B2 * | 7/2006 | Kuroki | ................. | B62D 57/032 180/8.1 |

(Continued)

FOREIGN PATENT DOCUMENTS

EP  1393867  2/2009

OTHER PUBLICATIONS

Atlas Robot, pre-2015, 1 page.
Humanoid Robots, pre-2015, 1 page.

*Primary Examiner* — Joseph Rocca
*Assistant Examiner* — Michael Stabley
(74) *Attorney, Agent, or Firm* — McDonnell Boehnen Hulbert & Berghoff LLP

(57) ABSTRACT

A robot assembly including, a back member, a pelvis base with a first side and a second side; wherein the pelvis base is rotatably connected to the back member between the first and second sides of the pelvis base, and rotatable around a back x-axis, a first hip member rotatably connected to the first side of the pelvis base and rotatable about a first hip x-axis, a first intermediate extension rotatably connected to the first hip member and rotatable about a first hip z-axis, and a first leg member rotatably connected to the first intermediate extension and rotatable about a first hip y-axis.

21 Claims, 8 Drawing Sheets

(56) References Cited

U.S. PATENT DOCUMENTS

| | | | |
|---|---|---|---|
| 7,324,872 B2 * | 1/2008 | Nagasaka | B25J 13/084 |
| | | | 318/568.1 |
| 7,942,221 B1 | 5/2011 | Tilden | |
| 7,946,364 B2 * | 5/2011 | Suga | B62D 57/032 |
| | | | 180/8.1 |
| 8,244,402 B2 | 8/2012 | Wells et al. | |
| 8,554,370 B2 | 10/2013 | Goswami et al. | |
| 8,612,053 B2 * | 12/2013 | Orita | B62D 57/032 |
| | | | 700/245 |
| 8,731,714 B2 | 5/2014 | Sanders et al. | |
| 8,751,041 B2 | 6/2014 | Moon et al. | |
| 8,855,821 B2 | 10/2014 | Seo et al. | |
| 2004/0211603 A1 * | 10/2004 | Furuta | B62D 57/032 |
| | | | 180/8.1 |
| 2004/0236469 A1 * | 11/2004 | Moridaira | B25J 9/1674 |
| | | | 700/245 |
| 2005/0113973 A1 * | 5/2005 | Endo | B25J 9/161 |
| | | | 700/245 |
| 2010/0057253 A1 * | 3/2010 | Kwon | B25J 19/0091 |
| | | | 700/245 |
| 2011/0147103 A1 | 6/2011 | Alfayad et al. | |
| 2011/0185837 A1 | 8/2011 | Alfayad et al. | |
| 2013/0231822 A1 | 9/2013 | Gouaillier | |
| 2014/0039675 A1 | 2/2014 | Ead | |
| 2014/0251702 A1 | 9/2014 | Berger et al. | |

* cited by examiner

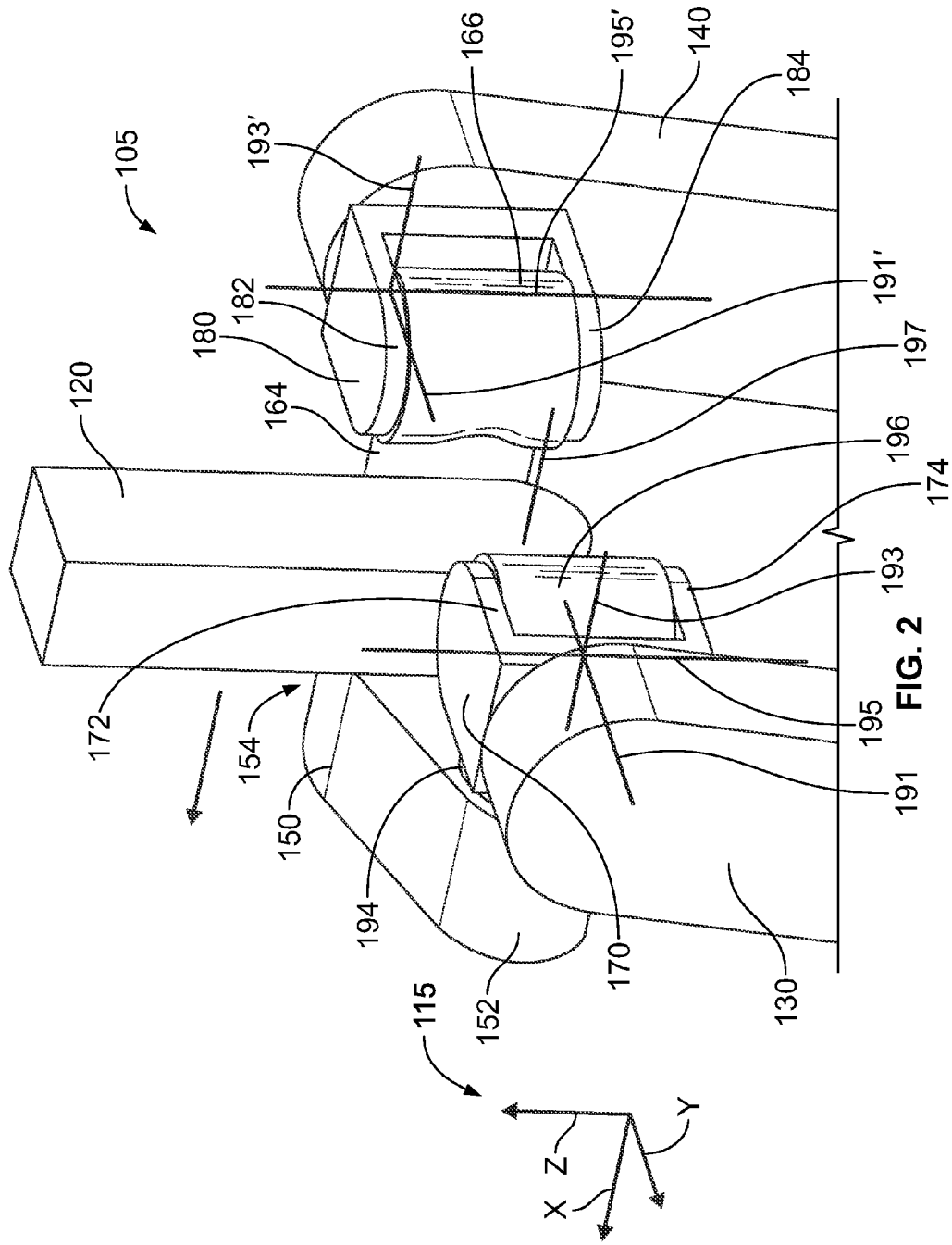

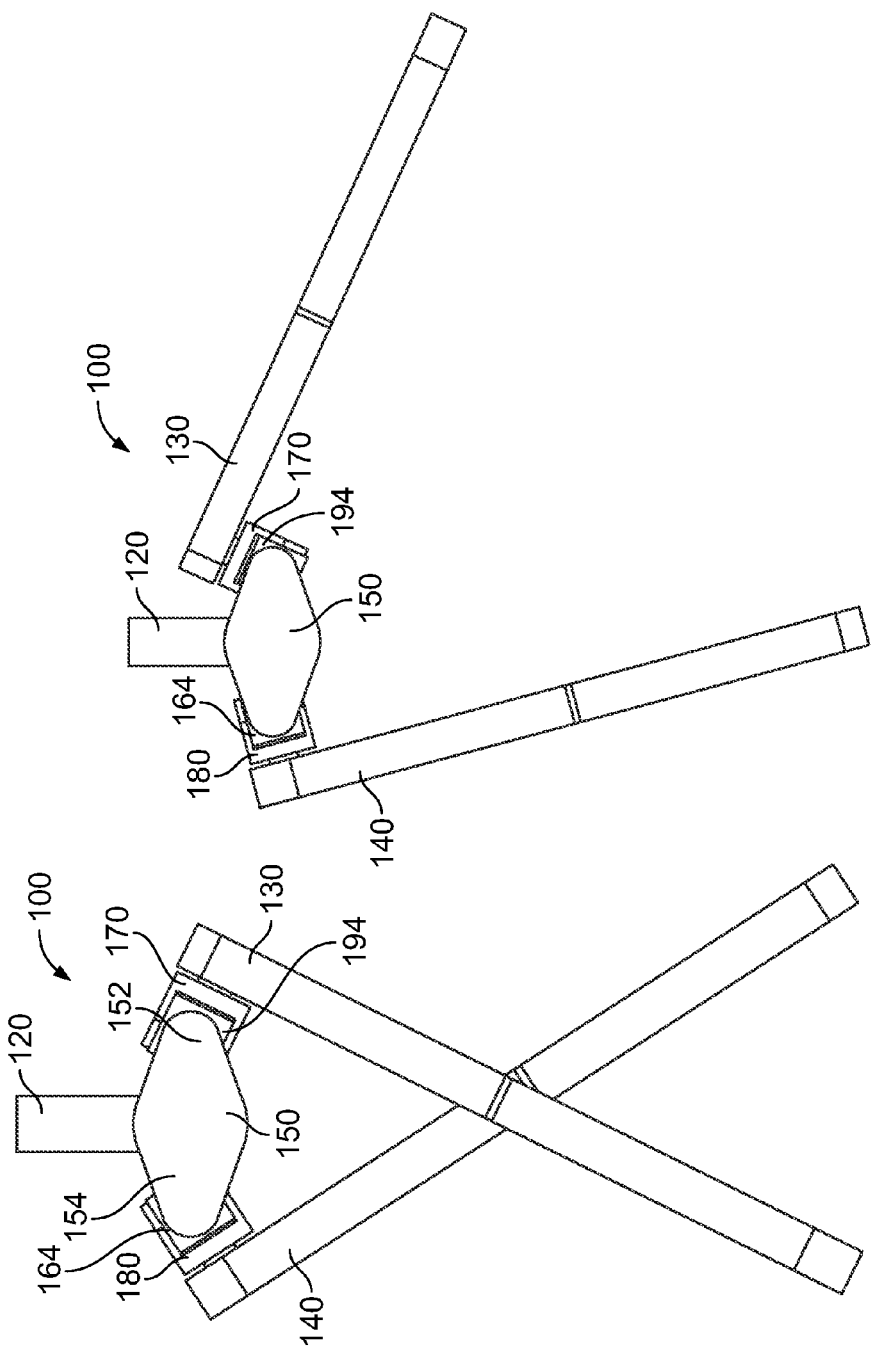

PELVIS STRUCTURE FOR HUMANOID ROBOT

BACKGROUND

Typical robots are automated devices that are formed of a plurality of rigid members, rotatably coupled to one or more other rigid members. As technology advances, various types of robotic devices are being created for performing a variety of functions that may assist users. Robotic devices may be used for applications involving material handling, transportation, welding, assembly, and dispensing among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present implementations are directed to a humanoid robot assembly that includes a pelvis base that is rotatably connected to a back member to allow the sides of the pelvis base to move up or down as the pelvis base rotates about a back x-axis, which in turn causes the tops of the legs to move up and down, thereby allowing the legs to straighten during walking, and allowing the robot to more closely mimic a human gait. One end of a first intermediate hip member is rotatably connected to a first side of the pelvis base and rotatable about a first hip x-axis (rotation causing the leg to move inwardly and outwardly) and the other end of the first intermediate hip member is rotatably connected to a first intermediate yoke which is rotatable about a first hip z-axis (rotation causing the leg to rotate the toes inwardly or outwardly). The first intermediate yoke is also rotatably connected to a first leg which is rotatable about a first hip y-axis (rotation causing the leg to move forward or backward, e.g. raising leg to the torso).

The humanoid robot assembly may further include a second leg. One end of a second intermediate hip member is rotatably connected to a second side of the pelvis base and rotatable about a second hip x-axis (rotation causing the leg to move inwardly and outwardly) and the other end of the second intermediate hip member is rotatably connected to a second intermediate yoke which is rotatable about a second hip z-axis (rotation causing the leg to rotate the toes inwardly or outwardly). The second intermediate yoke is also rotatably connected to a second leg which is rotatable about a second hip y-axis (rotation causing the leg to move forward or backward, e.g. raising leg to the torso). In some embodiments, the second and first hip y-axes may be coaxial.

A coordinate system 115 showing an orientation of the x, y, and z axes is set forth in FIG. 2, with the x-axis extending from the rear to the front generally horizontally, the y-axis extending from a first side to a second side generally horizontally, and a z-axis extending upwardly. The ordering of the joints X-Z-Y allows for a large range of motion of each leg about both the hip y and hip x axes. Rotation of the leg about the hip z-axis has a smaller range of motion, but this is acceptable as a large range of motion about the hip z-axis is not required. The humanoid robot assembly may further advantageously use hydraulic actuators to cause the relative rotation of the components.

The improved humanoid robot assembly is provided with a pelvis structure that is rotatably connected to a back member at the pelvis level that allows the humanoid robot to walk more naturally. The pelvis base may rotate +/−30 degrees about the back x-axis to move the sides of the pelvis base up and down to allow the legs to straighten out while walking and to allow for the humanoid robot to more closely mimic a human gait.

In one aspect, a robot assembly is provided including a back member, a pelvis base with a first side and a second side; wherein the pelvis base is rotatably connected to the back member between the first and second sides of the pelvis base, and rotatable around a back x-axis, a first hip member rotatably connected to the first side of the pelvis base and rotatable about a first hip x-axis, a first intermediate extension rotatably connected to the first hip member and rotatable about a first hip z-axis, and a first leg member rotatably connected to the first intermediate extension and rotatable about a first hip y-axis.

In a further aspect, the robot assembly may include a second hip member rotatably connected to the second side of the pelvis base and rotatable about a second hip x-axis, a second intermediate extension rotatably connected to the second hip member and rotatable about a second hip z-axis, and a second leg member rotatably connected to the second intermediate extension and rotatable about a second hip y-axis.

In another aspect, a robot assembly is provided including a back member, a pelvis base with a first side and a second side, wherein the pelvis base is rotatably connected to the back member between the first and second sides of the pelvis base, and rotatable around a back x-axis, a first hip member rotatably connected to the first side of the pelvis base and rotatable about a first hip x-axis, a first leg member rotatably connected to the first hip member and rotatable about a first hip y-axis, a second hip member rotatably connected to the second side of the pelvis base and rotatable about a second hip x-axis, and a second leg member rotatably connected to the second hip member and rotatable about a second hip y-axis.

In another aspect, a pelvis structure for a robot assembly is provided including a back member, a pelvis base with a first side and a second side, wherein the pelvis base is rotatably connected to the back member between the first and second sides of the pelvis base, and rotatable around a back x-axis, wherein the first side of the pelvis base is rotatably connected to a first end of a first hip member and rotatable about a first hip x-axis, wherein the first hip member is adapted to be rotatably connected to a top of a first leg member, with the first leg member rotatable about a first hip y-axis extending through a top of the first leg member, wherein the second side of the pelvis base is rotatably connected to a first end of a second hip member and rotatable about a second hip x-axis, and wherein the second hip member is adapted to be rotatably connected to a top of the second leg member, with the second leg member rotatable about a second hip y-axis extending through a top of the second leg member.

In yet a further aspect, a method of causing movement of a humanoid robot assembly is provided including the steps of (i) providing a humanoid robot assembly including a back member, a pelvis base with a first side and a second side, wherein the pelvis base is rotatably connected to the back member between the first and second sides of the pelvis base, and rotatable around a back x-axis, a first hip member rotatably connected to the first side of the pelvis base and rotatable about a first hip x-axis, and a first leg member rotatably connected to the first hip member and rotatable about a first hip y-axis, a second hip member rotatably connected to the second side of the pelvis base and rotatable about a second hip x-axis, and a second leg member rotatably connected to the second hip member and rotatable about a second hip y-axis; (ii) operating a first actuator positioned in one of the pelvis base and back member to cause relative rotation of the pelvis base and the back member to cause the first side of the pelvis base to be raised; (iii) operating a second actuator in the first leg member to cause relative rotation between the first leg member and the first hip member to cause the first leg member to be moved forward; (iv) operating the first actuator to cause relative rotation of the pelvis base and the back member to cause the second side of the pelvis base to be raised; and (v) operating a third actuator in the second leg member to cause relative rotation between the second leg member and the first hip member to cause the second leg member to be moved forward.

In a further aspect, means for causing relative movement between a pelvis base and a back member are provided; means for causing relative movement between a first side of a pelvis base and a first hip member are provided; means for causing relative movement between a second side of a pelvis base and a second hip member are provided; means for providing relative movement between a first hip member and a first leg are provided; and means for providing relative movement between a second hip member and a second leg are provided.

These as well as other aspects, advantages, and alternatives will become apparent to those of ordinary skill in the art by reading the following detailed description, with reference where appropriate to the accompanying Figures.

BRIEF DESCRIPTION OF THE DRAWINGS

FIG. 2 is a perspective view of a humanoid robot assembly 105, according to an example implementation;

FIG. 5A is a front view of humanoid robot assembly 105 shown in FIGS. 2-4, illustrating relative rotation between legs 130 and 140 and pelvis base 150, showing inward movement of legs 130 and 140;

FIG. 5B is a front view of humanoid robot assembly 105 shown in FIGS. 2-4, illustrating relative rotation between legs 130 and 140 and pelvis base 150, showing outward movement of legs 130 and 140;

DETAILED DESCRIPTION

Figure 1:
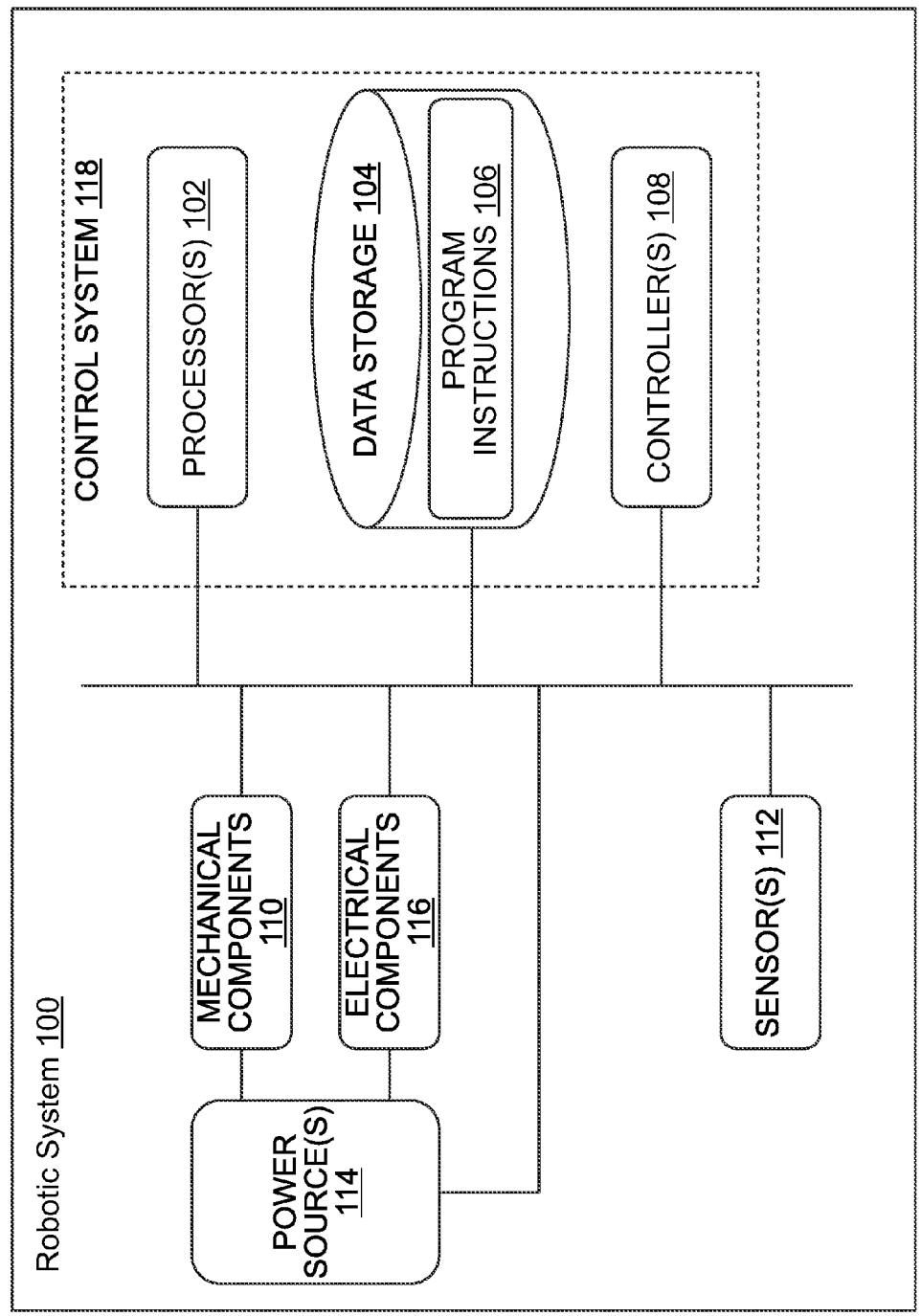
FIG. 1 illustrates a configuration of a robotic system 100, according to an example implementation.

Example apparatuses, systems and methods are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein and illustrated in the Figures, can be arranged, substituted, combined, separated, and designed in a wide variety of different configurations, all of which are contemplated herein. Further, unless otherwise noted, Figures are not drawn to scale and are used for illustrative purposes only. Moreover, the Figures are representational only and not all components are shown. For example, additional structural or restraining components might not be shown.

I. OVERVIEW

Humanoid robots have been designed that may have the shape and appearance of a human, and may include a pair of legs having knee joints, feet, a torso, as well as a pair of arms having elbow joints, and a head. Humanoid robots may be used to perform tasks that in the past have been performed by humans or other machines. For example, humanoid robots may be used to transport items from one location to another. To date, humanoid robots have been characterized by somewhat awkward, clunky, or stiff movement. For example, humanoid robots commonly employ a connection between the pelvis and the tops of the legs using a universal joint type connection, which provides acceptable degrees of freedom, but a limited range of motion, and does not allow for the humanoid robot to move and walk like a real human being.

It would be desirable to provide a humanoid robot having a greater range of motion and a greater ability to mimic the movement of a human being. In this regard, the present embodiments are directed to a humanoid robot that advantageously includes a pelvis base that is rotatably connected to a back member to allow the sides of the pelvis base to move up or down with respect to the axis of rotation between the pelvis base and the back member. In one embodiment, a humanoid robot is provided that includes a pelvis base having a first side, a second side, first and second hip members, a first leg, a second leg, and a back member.

The pelvis base is rotatably connected to a back member and rotatable about a back x-axis to allow the sides of the pelvis base to move up and down, which in turn causes the legs to move up and down to provide for a more natural walking motion. The first side of the pelvis base is rotatably connected to the first hip member with the first hip member rotatable with respect to the first side of the pelvis base about a first forwardly extending hip x-axis extending in a direction from a rear of the first side of the pelvis base towards a front of the first side of the pelvis base (rotation causing the first leg to rotate about the first hip x-axis and move inwardly or outwardly). The first hip member may also be rotatably connected to a first intermediate extension (which in some embodiments may be a yoke) which in turn is rotatably connected to a first leg. The first intermediate extension is rotatable with respect to the first hip member about an upwardly extending first hip z-axis which causes the first leg to rotate (rotation causing the front of a foot on the first leg to move inwardly or outwardly). The first leg may be rotatably connected to the first intermediate extension such that the first leg is rotatable with respect to the first intermediate member (and hip member) about a first hip y-axis laterally extending through a top of the first leg and a top of the second leg (rotation causing the leg to move backward or forward about the first hip y-axis). In other embodiments a first intermediate extension may not be required, with the first hip member rotatably connected directly to the first leg. The ordering of the joints advantageously provides for an X-Z-Y joint order that provides for a large range of motion for the first leg about the x and y axes.

The second side of the pelvis base, second hip member, and second leg may be, but are not required to be, rotatably connected in the same manner as the first side of the pelvis base, first hip member, and first leg. However, in some embodiments it may be desirable to rotatably connect the second side of the pelvis base, second hip member, and second leg in the same manner as the first side of the pelvis, first hip member, and first leg.

With this configuration, the first and second sides of the pelvis base may move above and below the axis of rotation between the back member and the pelvis base (back x-axis), in turn moving the first and second legs up or down, and allowing the humanoid robot to more closely mimic the gait of a human. With this configuration, because the first and second sides of the pelvis base can be moved above the point of rotation between the back member and the pelvis base, the first and second legs can be straightened out during walking to more closely walk the way a human does. In addition, rotation of the pelvis base with respect to the back member causes the sides of the pelvis base to move up or down, in turn causing the first and second legs to move up or down to provide for a more natural movement.

In addition, the first hip x-axis and the second hip x-axis may be parallel to one another. The back x-axis may be positioned in a plane formed by the first hip x-axis and the second hip x-axis, or the back x-axis may be positioned above or beneath the first hip x-axis and the second hip x-axis. The back x-axis may advantageously extend between the top of the first leg and the top of the second leg to provide relative rotation between the pelvis base and the back member at the pelvis level. In addition, the pelvis base may be positioned either in front of or behind the back member. Furthermore, the first hip y-axis and the second hip y-axis may be, but are not required to be, coaxial.

Some embodiments may include a first yoke as the first intermediate member rotatably connected to the first hip member, with the first yoke rotatable with respect to the first hip member about an upwardly extending hip z-axis, and also include a second yoke as the second intermediate member connected to the second hip member, with the second yoke rotatable with respect to the second hip member about an upwardly extending hip z-axis. In this configuration, the top of first leg may be rotatably connected to a first yoke, with top of the first leg rotatable with respect to the first yoke about the first hip y-axis, and the top of second leg may be rotatably connected to the second yoke, with the top of the second leg rotatable with respect to the second yoke about the second hip y-axis. Rotation of the first yoke with respect to the first hip member causes the first leg to rotate inwardly or outwardly about the first hip z-axis (moving the foot inwardly or outwardly), and rotation of the second yoke with respect to the second hip member causes the second leg to rotate inwardly or outwardly about the second hip z-axis (moving the foot inwardly or outwardly). Rotation of the first leg with respect to the first yoke causes the first leg to move forward or backward as it rotates about the first hip y-axis. Rotation of the second leg with respect to the second yoke causes the second leg to move forward or backward as it rotates about the second hip y-axis.

Actuators such as electric motors or hydraulic cylinders may be used to provide for relative rotation between the various components. For example, an actuator within the back member or pelvis base may be operable to cause relative rotation about the back x-axis between the pelvis base and the back member. Actuators positioned within the first and second sides of the pelvis base may be operable to cause relative rotation about the first hip x-axis between the first side of the pelvis base and the first hip member, and to cause relative rotation about the second hip x-axis between the second side of the pelvis base and the second hip member. Further, an actuator within the first hip member may be operable to cause relative rotation about the first hip z-axis between the first yoke and the first hip member, and an actuator within the second hip member may be operable to cause relative rotation about the second hip z-axis between the second yoke and the second hip member. Actuators within the first and second legs may be operable to cause relative rotation about the first and second hip y-axes between the first and second legs and the first and second hip members (and first and second yokes), respectively.

In addition, hydraulic actuators may be used which may provide advantages over electric actuators, because electric actuators require a greater amount of energy to hold components in position as compared to hydraulic actuators. Examples of different types of actuators that could be used include electric motors with a harmonic gearbox and/or belt drive or roller screw. Also a hydraulic cylinder with a linkage and/or cam or cable drive could be used as well.

The present embodiments also provide significant advantages in terms of range-of-motion given the X-Z-Y joint ordering. In particular, wherein rotation of the first leg and the second leg about the hip y-axis may be at least 135 degrees in a forward direction, or a range of up to 180 degrees in the forward and backward directions, and in some embodiments may be able to rotate 360 degrees. This provides a much greater range of motion when compared to universal joint connections between the tops of legs and the torso commonly used in humanoid robots.

Furthermore, rotation of the first leg about the first hip x-axis may be up to 180 degrees, and the rotation of the second leg about the second hip x-axis may be up to 180 degrees, a significant increase in range of motion compared to the commonly used universal joint connections. The present embodiments may provide for relative rotation between the pelvis base and back member of +/−30 degrees, thereby providing a range of motion to allow the humanoid robot more closely mimic the human gait.

The present embodiments provide (i) for inward and outward movement of the first leg by rotating about the first hip x-axis, and inward and outward movement of the second leg by rotating about the second hip x-axis; (ii) inward or outward rotation of the first and second legs through rotation about the first and second upwardly extending hip z-axes, respectively; and (iii) for forward or backward movement of the first and second legs as they rotate about the first and second hip y-axes. In addition, having a rotating pelvis with respect to the back member provides for upward or downward movement of the first and second legs. These attributes provide the ability of a humanoid robot to have a more natural gait that may closely mimic a human gait. The rotating pelvis allows the legs to straighten during walking to allow for the more natural gait.

II. EXAMPLE HUMANOID ROBOT ASSEMBLIES

Referring now to the figures, FIG. 1 illustrates an example configuration of a robotic system that may be used in connection with the humanoid robot assemblies set forth in FIGS. 2-6. The robotic system 100 represents an example robotic system configured to perform the methods described herein. Additionally, the robotic system 100 may be configured to operate autonomously, semi-autonomously, and/or using directions provided by user(s), and may exist in various forms, such as a humanoid robot. Furthermore, the robotic system 100 may also be referred to as a humanoid robot, robotic device, mobile robot, or robot, among others.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes as robotic system 100 and may include more or less components within examples without departing from the scope of the invention. The various components of robotic system 100 may be connected in any manner, including wired or wireless connections, etc. Further, in some examples, components of the robotic system 100 may be positioned on multiple entities rather than a single entity. Other example illustrations of robotic system 100 may exist as well.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide functionality of controller(s) 108, where the controller(s) 108 may be configured to cause activation and deactivation of the mechanical components 110 and the electrical components 116.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 may include at least one controller 108, which may interface with the robotic system 100. The controller 108 may serve as a link between portions of the robotic system 100, such as a link between mechanical components 110 and/or electrical components 116. In some instances, the controller 108 may serve as an interface between the robotic system 100 and another computing device. Further, the controller 108 may serve as an interface between the robotic system 100 and a user(s). The controller 108 may include various components for communicating with the robotic system 100, including a joystick(s), buttons, among others. The example interfaces and communications noted above may be implemented via a wired or wireless connection, or both. The controller 108 may perform other functions for the robotic system 100 as well. Other examples of controllers may exist as well.

Mechanical components 110 represent possible hardware of the robotic system 100 that may enable the robotic system 100 to operate and perform physical operations. As a few examples, the robotic system 100 may include actuator(s), extendable leg(s) ("legs"), arm(s), wheel(s), one or more structured bodies for housing the computing system or other components, and other mechanical components. The mechanical components 110 may depend on the design of the robotic system 100 and may also be based on the functions and/or tasks the robotic system 100 may be configured to perform. As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the leg.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by controller 108 and/or a computing system of the robotic system 100.

The sensor(s) 112 may provide information indicative of the environment of the robot for the controller 108 and/or computing system to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes RADAR, LIDAR, SONAR, VICON®, one or more cameras, a global positioning system (GPS)

transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of a function, such as a gait, that the robotic system 100 may currently be operating. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Other power sources may be included within the robotic system 100.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various functions. The electrical components 116 may be configured to provide power from the power source(s) 114 to the various mechanical components 110, for example. Further, the robotic system 100 may include electric motors. Other examples of electrical components 116 may exist as well.

FIG. 2 illustrates an example humanoid robot assembly 105, according to an example implementation. Among other possible functions, the humanoid robot assembly 105 may be configured to perform some of the methods described herein during operation. The humanoid robot assembly 105 may include a control system. Each leg may include a foot that may contact the ground surface. The humanoid robot assembly 105 may also include a torso, arms, and head. The humanoid robot assembly may also include sensors configured to provide sensor data to the control system 105 of the humanoid robot assembly 105. Within other example implementations, the humanoid robot assembly 105 may include more or less components and may additionally include components not shown in FIG. 2.

The humanoid robot assembly 105 may be a physical representation of the robotic system 100 shown in FIG. 1 or may be based on other configurations. To operate, the humanoid robot assembly 105 includes a computing system that may be made up of one or more computing devices configured to assist in various operations of the humanoid robot assembly 105, which may include processing data and providing outputs based on the data. The computing system may process information provided by various systems of the humanoid robot assembly 105 (e.g., a sensor system) or from other sources (e.g., a user, another robot, a server) and may provide instructions to the systems to operate in response.

Additionally, the computing system may monitor systems of the humanoid robot assembly 105 during operation, to determine errors and/or monitor regular operation, for example. In some example configurations, the computing system may serve as a connection between the various systems of the humanoid robot assembly 105 that coordinates the operations of the systems together to enable the humanoid robot assembly 105 to perform functions. Further, although the operations and methods described herein correspond to a computing system of a robot performing tasks, the computing system may be made of multiple devices, processors, controllers, and/or other entities configured to assist in the operation of the robot. Additionally, the computing system may operate using various types of memory and/or other components.

The configuration, position, and/or structure of the legs 130 and 140 may vary in example implementations. The legs 130 and 140 enable the humanoid robot assembly 105 to move and may be configured to operate in multiple degrees of freedom to enable different techniques of travel to be performed. In particular, the legs 130 and 140 may enable the humanoid robot assembly 105 to travel at various speeds through mechanically controlling the legs 130 and 140 according to the mechanics set forth within different gaits. A gait is a pattern of movement of the limbs of an animal, robot, or other mechanical structure. As such, the humanoid robot assembly 105 may navigate by operating the legs 130 and 140 to perform various gaits. The humanoid robot assembly 105 may use a variety gaits to travel within an environment, which may involve selecting a gait based on speed, terrain, the need to maneuver, and/or energy efficiency.

Further, different types of robots may use different gaits due to differences in design that may prevent use of certain gaits. Although some gaits may have specific names (e.g., walk, trot, run, bound, gallop, etc.), the distinctions between gaits may overlap with some gaits having slight variations. The gaits may be classified based on footfall patterns, also known as the locations on the ground surface for the placement the feet on legs 130 and 140. Similarly, gaits may also be classified based on mechanics. One or more systems of the humanoid robot assembly 105, such as the control system 118, may be configured to operate the legs 130 and 140 to cause the humanoid robot assembly 105 to move. Additionally, the humanoid robot assembly 105 may include other mechanical components, which may be attached to the robot humanoid mechanical arms, grippers, or other features. In some examples, the legs 130 and 140 may have other types of mechanical features that enable control upon various types of surfaces that the robot may encounter, such as wheels, etc. Other possibilities also exist.

As part of the design of the example humanoid robot assembly 105, a torso may be attached to the back member 120 and may house various components of the humanoid robot assembly 105. As such, the structure of the torso may vary within examples and may further depend on particular functions that a given robot may have been designed to perform. For example, a robot developed to carry heavy loads may have a wide body that enables placement of the load. Similarly, a robot designed to reach high speeds may have a narrow, small body that does not have substantial weight. Further, the components of the humanoid robot 105 may be developed using various types of materials, such as various metals or plastics. Within other examples, a robot may have a body with a different structure or made of other types of materials.

The sensor(s) of the humanoid robot 105 may include various types of sensors, such as a camera or sensing system. The sensor(s) may be positioned on the front of the torso or body, but may be placed at other positions of the robot as well. As described for the robotic system 100, the humanoid robot 105 may include a sensory system that includes force sensors, position sensors, IMUs, RADAR, LIDAR, SONAR, VICON®, GPS, accelerometer(s), gyroscope(s), and/or other types of sensors. The sensor(s) may be configured to measure parameters of the environment of the humanoid robot assembly 105 as well as monitor internal operations of systems of the humanoid robot assembly 105. As an example illustration, the humanoid robot assembly 105 may include sensors that monitor the accuracy of its systems to enable the computing system to detect a system within the robot 100 that may be operating incorrectly. Other uses of the sensor(s) may be included within examples.

Additionally, as shown with the robotic system 100, the humanoid robot assembly 105 may also include various electrical components that may enable operation and communication between the mechanical features of the humanoid robot assembly 105. Also, the humanoid robot assembly 105 may include one or more computing systems that include one or more processors configured to perform various functions, including processing inputs to provide control over the operation of the humanoid robot assembly 105. The computing system may include additional components, such as various types of storage and a power source, etc.

During operation, the computing system may communicate with other systems of the humanoid robot assembly 105 via wired or wireless connections and may further be configured to communicate with one or more users of the robot. As one possible illustration, the computing system may receive an input from a user indicating that the user wants the robot to perform a particular gait in a given direction. The computing system may process the input and may perform an operation that may cause the systems of the robot to perform the requested gait. Additionally, the robot's electrical components may include interfaces, wires, busses, and/or other communication links configured to enable systems of the robot to communicate.

Furthermore, the humanoid robot assembly 105 may communicate with one or more users and/or other robots via various types of interfaces. In an example implementation, the humanoid robot assembly 105 may receive input from a user via a joystick or similar type of interface. The computing system may be configured to measure the amount of force and other possible information from inputs received from a joystick interface. Similarly, the humanoid robot assembly 105 may receive inputs and communicate with a user via other types of interfaces, such as a mobile device or a microphone. The computing system of the humanoid robot assembly 105 may be configured to process the various types of inputs that the humanoid robot assembly 105 may receive.

As shown in FIG. 2, humanoid robot assembly 105 includes a pelvis base 150 having a first side 152, a second side 154, first and second hip members 194, 164, a first leg 130, a second leg 140, and a back member 120. In this example implementation the pelvis base 150 is positioned on the front of the humanoid robot assembly 105. Although not shown for ease of reference, humanoid robot assembly 105 may further include a torso, arms, and head. A coordinate system 115 shows the orientation of the x, y, and z axes.

The first side 152 of the pelvis base 150 is rotatably connected to a first end of the first hip member 194 with the first hip member 194 rotatable with respect to the first side 152 of the pelvis base 150 about a first hip x-axis 193. Hip x-axis 193 extends in a direction from a rear of the first side 152 of the pelvis base 150 towards a front of the first side 152 of the pelvis base 150. The first hip member 194 is rotatably connected to a top of the first leg 130 through yoke 170 with yoke flange 172 positioned above an end of first hip member 194 and yoke flange 174 positioned below the end of the first hip member 194. The top of the first leg 130 is rotatable with respect to the first hip member 194 and yoke 170 about a first hip y-axis 191 extending laterally through a top of the first leg 130. Rotation of the first hip member 194 with respect to the first side 152 of the pelvis base 150 causes the first leg 130 to move inwardly or outwardly rotating about the first hip x-axis. Rotation of the first leg 130 with respect to the first hip member 194 and the yoke 170 causes the first leg 130 to move backward or forward rotating about the first hip y-axis 191. Rotation of the first yoke 170 with respect to the end of the first hip member 194 causes the first leg 130 to rotate inwardly or outwardly (i.e. causing the front of a foot to move to the right or left) rotating about the first hip z-axis 195.

The second side 154 of the pelvis base 150 is rotatably connected to a first end of the second hip member 164. The second hip member 164 is rotatable with respect to the second side 154 of the pelvis base 150 about a second hip x-axis 193'. Hip x-axis 193' extends in a direction from the rear of the second side 154 of the pelvis base 150 towards the front of the second side 154 of the pelvis base 150. The second hip member 164 is rotatably connected to a top of the second leg 140 through yoke 180 with yoke flange 182 positioned above an end of the second hip member 164 and yoke flange 184 positioned below the end of the second hip member 164. The top of the second leg 140 is rotatable with respect to the second hip member 164 and the yoke 180 about second hip y-axis 191'. Rotation of the second hip member 164 with respect to the second side 154 of the pelvis base 150 causes the second leg 140 to move inwardly or outwardly rotating about the second hip x-axis 193'. Rotation of the second leg 140 with respect to the second hip member 164 and second yoke 180 causes the second leg 140 to move backward or forward rotating about the second hip y-axis 191'. Rotation of the second yoke 180 with respect to the end of the second hip member 164 causes the second leg 140 to rotate inwardly or outwardly (i.e. causing the front of a foot to move to the right or left) rotating about the second hip z-axis 195'.

The pelvis base 150 is rotatably connected to the back member 120 between the first and second sides 152, 154 of the pelvis base 150. The pelvis base 150 is rotatable with respect to the back member 120 about a back x-axis 197 extending through the pelvis base 150 and back member 120. With this configuration, the first and second sides 152, 154 of the pelvis base 150 may move above and below the axis of rotation (back x-axis 197) between the back member 120 and the pelvis base 150, and allowing the humanoid robot assembly 105 to more closely mimic the gait of a human. With this configuration, because the first and second sides 152, 154 of the pelvis base 150 can be moved above the axis of rotation (back x-axis 197) between the back member 120 and the pelvis base 150, the first and second legs 130, 140 can be straightened out during walking to more closely walk the way a human does. In addition, rotation of the pelvis base 150 with respect to the back member 120 causes the sides 152, 154 of the pelvis base 150 to move up or down, in turn causing the first and second legs 130, 140 to move up or down to provide for more natural movement.

In addition, the first hip x-axis 193 and the second hip x-axis 193' may be parallel to one another. The back x-axis 197 may be positioned in a plane formed by the first hip x-axis 193 and the second hip x-axis 193', or the back x-axis 197 may be positioned above or beneath the first hip x-axis 193 and the second hip x-axis 193'. The back x-axis 197 may advantageously extend between the top of the first leg 130 and the top of the second leg 140 to provide relative rotation between the pelvis base 150 and the back member 120 at the pelvis level. In addition, although the pelvis base 150 is shown positioned in front of the back member 120, the pelvis base also may be positioned behind the back member 120. Further, the first and second hip y-axes 191 and 191' may be coaxial.

As noted above, actuators such as electric motors or hydraulic cylinders may be used to provide for relative rotation between the various components. For example, an actuator within the back member 120 or pelvis base may be operable to cause relative rotation about the back x-axis 197 between the pelvis base 150 and the back member 120. Alternately, an actuator within the pelvis base 150 may be operable to cause relative rotation about the back x-axis 197 between the pelvis base 150 and the back member 120. Actuators positioned within the first and second sides 152, 154 of the pelvis base 150 may be operable to cause relative rotation about the first hip x-axis 193 between the first side 152 of the pelvis base 150 and the first hip member 194, and to cause relative rotation about the second hip x-axis 193' between the second side 154 of the pelvis base 150 and the second hip member 164. Alternately, actuators positioned within the first and second hip members 164 and 194 may be operable to cause relative rotation about the first hip x-axis 193 between the first side 152 of the pelvis base 150 and the first hip member 194, and to cause relative rotation about the second hip x-axis 193' between the second side 154 of the pelvis base 150 and the second hip member 164. Further, an actuator within the first hip member 194 may be operable to cause relative rotation about the first hip z-axis 195 between the first yoke 170 and the first hip member 194, and an actuator within the second hip member 164 may be operable to cause relative rotation about the second hip z-axis 195' between the second yoke 180 and the second hip member 164. An actuator within the first leg 130 may be operable to cause relative rotation about the first hip y-axis 191 between the first leg 130 and the first yoke 170 (and first hip member 194), and an actuator within the second leg 140 may be operable to cause relative rotation about the second hip y-axis 191' between the second leg 140 and the second yoke 180 (and the second member 164).

In some embodiments, the use of yokes 170, 180 may not be required. In such cases, the first leg 130 may be directly connected to the first hip member 194 without a yoke. In such cases, relative rotation between the first leg 130 and the first hip member 194 about the first hip y-axis 191 may be caused by an actuator positioned in either the first leg 130 or the first member 194. Similarly, the second leg 140 may be directly connected to the second hip member 164 without a yoke. In such a case relative rotation between the second leg 140 and the second hip member 164 about the second hip y-axis 191' may be caused by an actuator positioned in either the second leg 140 of the second hip member 164.

Figure 3:
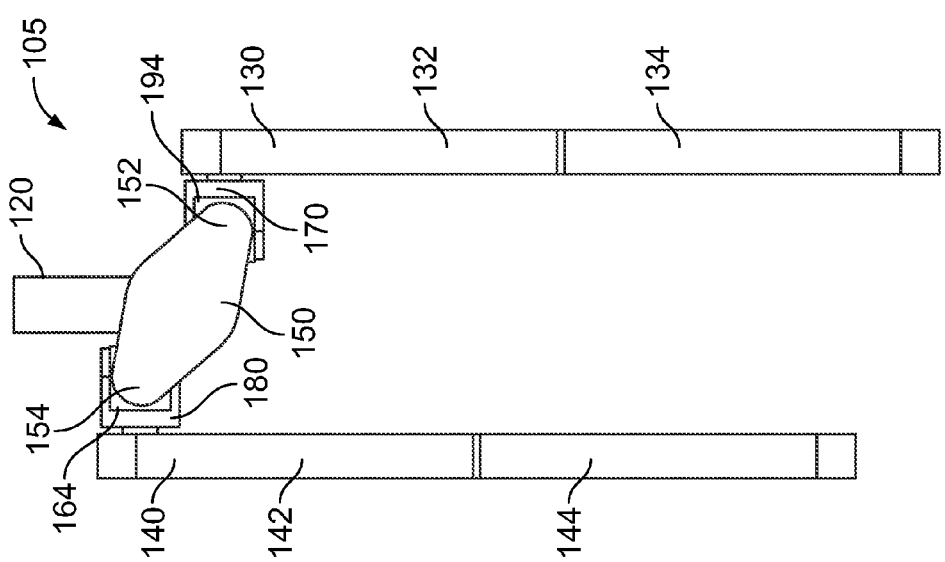
FIG. 3 is a front view of the humanoid robot assembly 105 shown in FIG. 2, illustrating relative rotation between pelvis base 150 and back member 120.

FIG. 3 is a front view of the humanoid robot assembly 105 shown in FIG. 2, illustrating relative rotation between pelvis base 150 and back member 120. In particular, the pelvis base 150 has been rotated relative to back member 120. First side 152 of the pelvis base 150 has been lowered relative to the back member 120, and rotated with respect to the first hip member 194, and second side 154 of the pelvis base 150 has been raised relative to back member 120, and rotated with respect to the second hip member 164. First leg 130 having upper portion 132 connected to lower portion 134 is shown connected to yoke 170 and first hip member 194. Second leg 140 having upper portion 142 and lower portion 144 is shown connected to yoke 180 and to second hip member 164. As used herein the term "connected" encompasses both direct and indirect connections. Therefore, the first leg 130 is "connected" to the first hip member 194 even though there is a yoke 170 disposed between them. Similarly, the second leg 140 is "connected" to the second hip member 164 even though there is a yoke 180 disposed between them.

In some implementations, the pelvis base 150 may be rotated +/−30 degrees with respect to the back member 120. However, a larger degree of rotation or a lesser degree of rotation may also be used. A rotation of the pelvis base 150 of +/−30 degrees provides a sufficient degree of rotation to allow for the humanoid robot assembly 105 to more closely mimic a human gait. In particular, as the second side 154 of the pelvis base 150 is rotated upwardly about the back x-axis 197 (shown in FIG. 2), the second leg 140 moves upwardly as well allowing the lower portion 144 of the second leg 140 to be lifted off the ground. In this position, the upper portion 142 and the lower portion 144 of the second leg may be straightened, allowing for more natural movement of the humanoid robot assembly 105.

Figure 4:
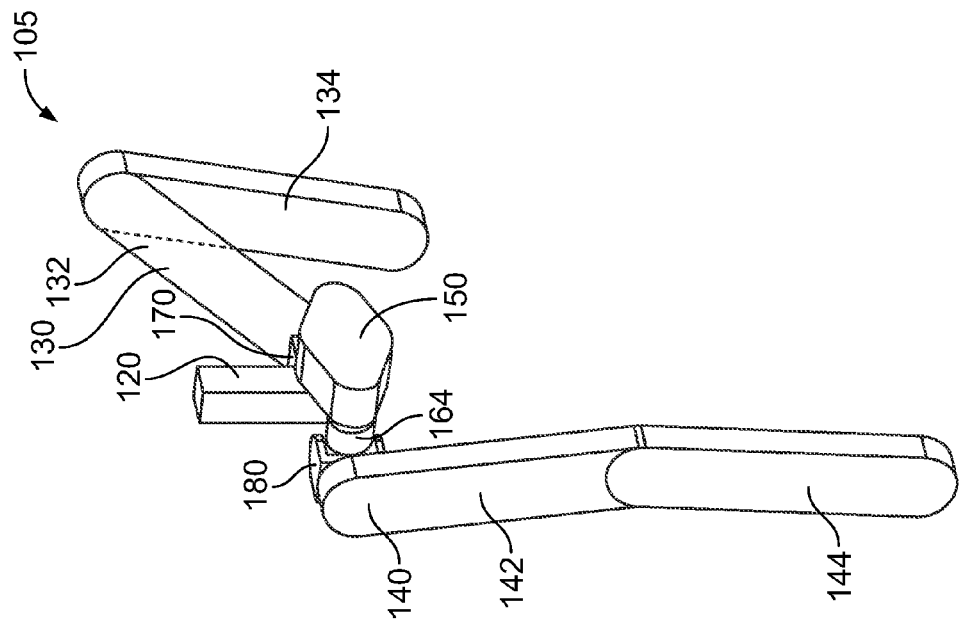
FIG. 4 is a perspective view of humanoid robot assembly 105 shown in FIGS. 2 and 3, illustrating relative rotation between first leg 130 and yoke 170.

FIG. 4 is a perspective view of humanoid robot assembly 105 shown in FIGS. 2 and 3, illustrating relative rotation between first leg 130 and yoke 170. In particular, the upper portion 132 of first leg 130 is shown rotated upwardly towards the back member 120 (and torso not shown) about the first hip y-axis 191 (shown in FIG. 2). Relative rotation between the upper portion 132 and lower portion 130 of the first leg 130 is also included to provide a knee joint similar to that of a human.

The humanoid robot assembly 105 provides significant advantages in terms of range of motion. In particular, rotation of the first leg 130 and the second leg 140 about the first and second hip y-axes may be at least 135 degrees in a forward direction, or up to 180 degrees in the forward and backward directions, and in some embodiments may be able to rotate 360 degrees. This provides a much greater range of motion when compared to universal joint connections between the tops of legs and the pelvis commonly used in humanoid robots.

It will further be appreciated that the second yoke 180 may be rotated relative to the second hip member 194 about the second hip z-axis 195' (shown in FIG. 2) to rotate the first leg 130 in an outward or inward direction (out-toe or in-toe). Alternately, or in addition, the first yoke 170 may be rotated relative to the first hip member 194 (shown in FIGS. 2 and 3) about the first hip z-axis 195 (shown in FIG. 2) to rotate the first leg 130 in an outward or inward direction (out-toe or in-toe). Including the yokes 170 and 180 as intermediate members allows for a greater range of motion for the legs 130, 140 about the x and y axes, as rotation about the z axis may be less important. Rotation about the z axis may be less than 180 degrees, and may be provided on the order 145 degrees, although a lesser range of motion about the z axis may also be provided.

FIG. 5A is a front view of humanoid robot assembly 105 shown in FIGS. 2-4, illustrating relative rotation between legs 130 and 140 and pelvis base 150 showing inward movement of legs 130 and 140. In particular, in FIG. 5A, the first hip member 194 (shown in FIGS. 2 and 3) has been rotated relative to the first side 152 of pelvis base 150 about the first hip x-axis 193 (shown in FIG. 2) to cause the first leg 130 to move inwardly towards the second leg 140. Similarly, the second hip member 164 (shown in FIGS. 2 and 3) has been rotated relative to the second side of the pelvis base 150 about the second hip x-axis 193' (shown in FIG. 2) to cause the second leg 140 to move inwardly towards the first leg 130. In FIG. 5A, the first leg 130 and the second leg 140 are able to be moved to such an extent that they are crossed. This allows the humanoid robot assembly 105 to be function more closely to a human.

FIG. 5B is a front view of humanoid robot assembly 105 shown in FIGS. 2-4, illustrating relative rotation between legs 130 and 140 and pelvis base 150 showing outward movement of first leg 130. In particular, in FIG. 5B, the first hip member 194 (shown in FIGS. 2 and 3) has been rotated relative to the first side 152 of pelvis base 150 about the first hip x-axis 193 (shown in FIG. 2) to cause the first leg 130 to move outwardly away from the second leg 140. To provide balance to the humanoid robot assembly 105 in this position, the second hip member 164 (shown in FIGS. 2 and 3) has been rotated relative to the second side of the pelvis base 150 about the second hip x-axis 193' (shown in FIG. 2) to cause the second leg 140 to move inwardly towards the first leg 130. The ability to have the first leg 130 move outwardly and the second leg to move inwardly to provide balance in this manner further allows the humanoid robot assembly 105 to function more closely to a human.

Furthermore, rotation of the first leg 130 about the first hip x-axis 193 (shown in FIG. 2) may be up to 180 degrees, and the rotation of the second leg 140 about the second hip x-axis 193' (shown in FIG. 2) may be up to 180 degrees, a significant increase in range of motion compared to the commonly used universal joint connections. A smaller range of rotation of the hip x axes may also be provided.

Figure 6:
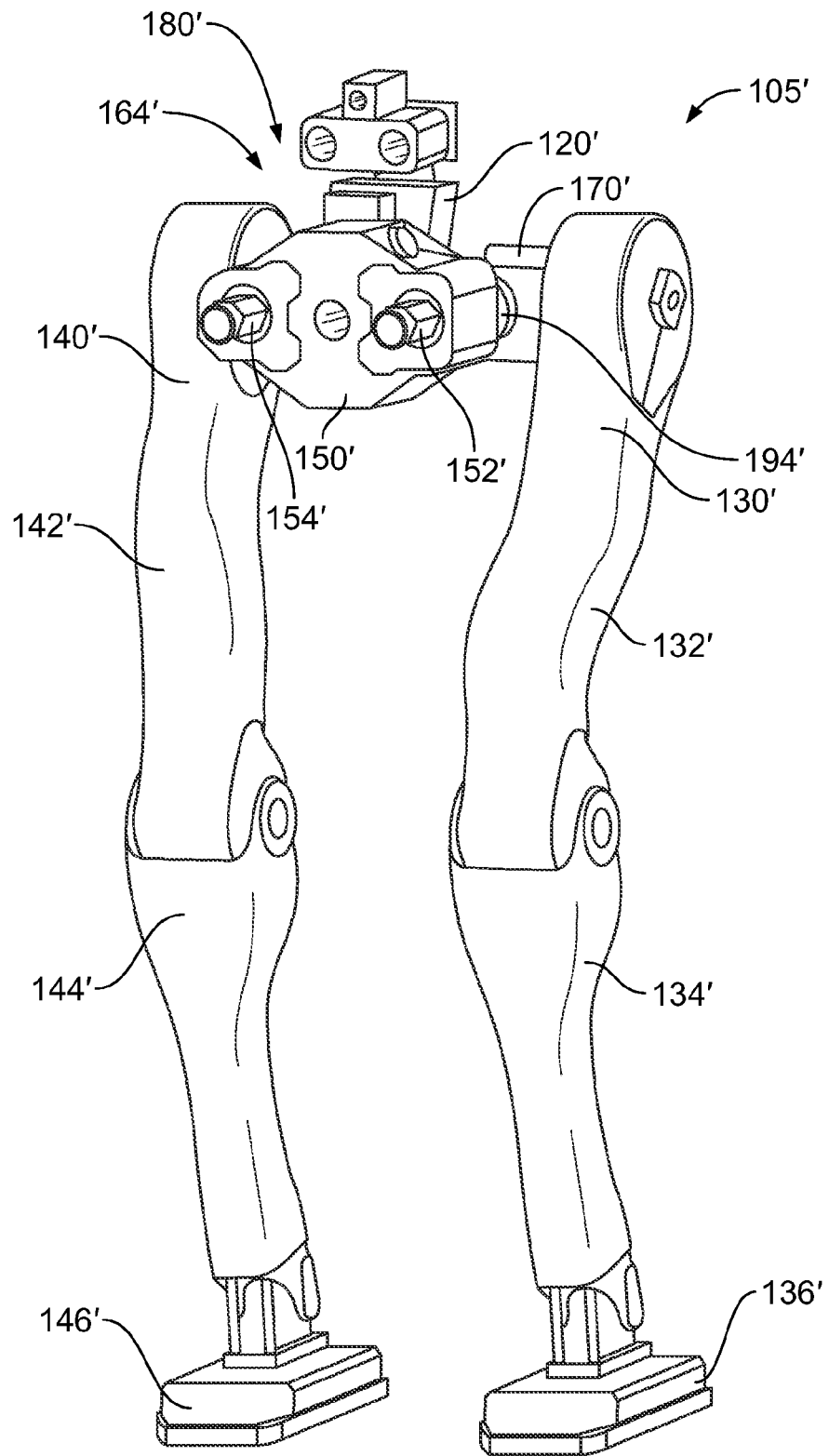
FIG. 6 is a front perspective view of humanoid robot assembly 105' that provides additional detail regarding a particular implementation of the humanoid robot assembly 105, according to an example implementation.

FIG. 6 is a front perspective view of humanoid robot assembly 105' that provides additional detail regarding a particular implementation of the humanoid robot assembly 105, according to an example embodiment. Humanoid robot assembly 105' includes pelvis base 150' that is rotatably connected to back member 120'. Pelvis base 150' is rotatable relative to the back member 120' about a back x-axis that extends through the pelvis member 150' and the back member 120'. A rearwardly extending first hip member 194' is also rotatably connected to a first side 152' of pelvis base 150' where the first hip member 194' is rotatable relative to the first side 152' of the pelvis base 150' about a first hip x-axis coaxial with the first hip member 194'. The first hip member 194' is also rotatably connected to yoke 170', where the yoke 170' is rotatable relative to the first hip member 194' about a first upwardly extending hip z-axis. The first leg 130' having upper portion 132' and lower portion 134' is rotatably connected to yoke 170', where the first leg 130' is rotatable relative to the yoke 170' about a hip y-axis extending through a top of the first leg 130' and a top of the second leg 140'.

A rearwardly extending second hip member 164' (behind the pelvis base 150') is also rotatably connected to a second side 154' of pelvis base 150' where the second hip member 164' is rotatable relative to the second side 154' of pelvis base 150' about a second hip x-axis coaxial with the second hip member 164'. The second hip member 164' is also rotatably connected to yoke 180' (positioned behind the pelvis base 150'), where the yoke 180' is rotatable relative to the second hip member 164' about a second upwardly extending hip z-axis. The second leg 140' having upper portion 142' and lower portion 144' is rotatably connected to yoke 180', where the second leg 140' is rotatable relative to the yoke 180' about a hip y-axis extending through a top of the first leg 130' and a top of the second leg 140'. A knee joint is provided between the upper portion 132' and lower portion 134' of first leg 130', and a knee joint is provided between the upper portion 142' and lower portion 144' of second leg 140'. A foot 136' is provided at the bottom of lower portion 134' of the first leg 130' and another foot 146' is provided on the bottom of lower portion 144' of the second leg 140'.

The present embodiments advantageously provide a joint order of X-Z-Y providing a large range of motion of the legs about the x and y axes. In particular, the present embodiments provide for (i) inward and outward movement of the first leg by rotating about the first hip x-axis, and inward and outward movement of the second leg by rotating about the second hip x-axis; (ii) inward or outward rotation of the first and second legs (to provide inward and outward movement of feet attached the legs) through rotation about the first and second upwardly extending hip z-axes, respectively; and (iii) forward or backward movement of the first and second legs as they rotate about the first and second hip y-axes. In addition, having a rotating pelvis with respect to the back member at the pelvis level about a back x-axis provides for upward or downward movement of the first and second legs. These attributes provide the ability for a humanoid robot to have a more natural gait that may closely mimic a human gait. The rotating pelvis allows the legs to straighten during walking to allow for the more natural movement.

Figure 7:
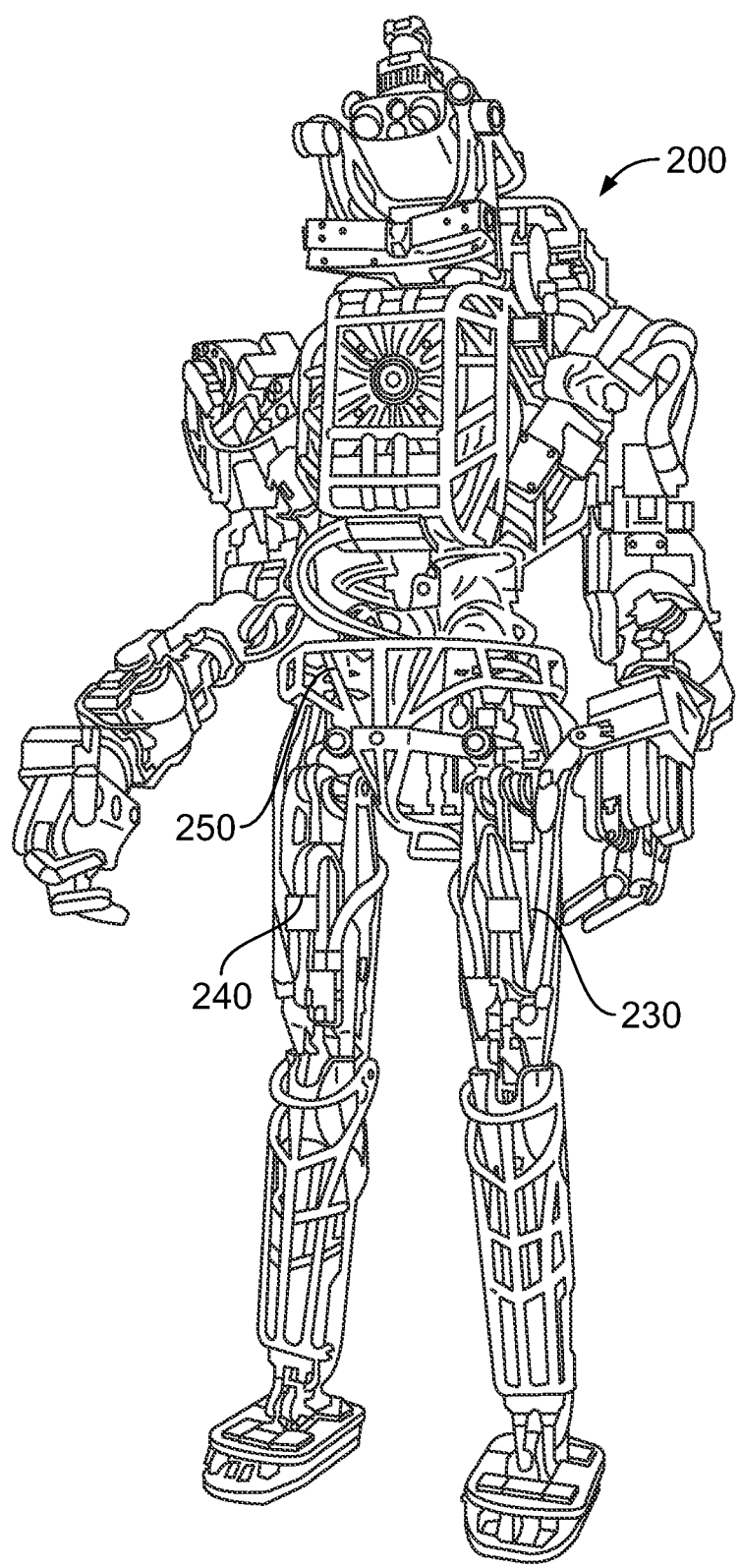
FIG. 7 is a front perspective view of humanoid robot 200.

FIG. 7 is a front perspective view of humanoid robot 200 having a pelvis area 250 and legs 230, 240, which is an example of a humanoid robot that does not include relative rotation between a pelvis structure and a back member at a pelvis level.

Figure 8:
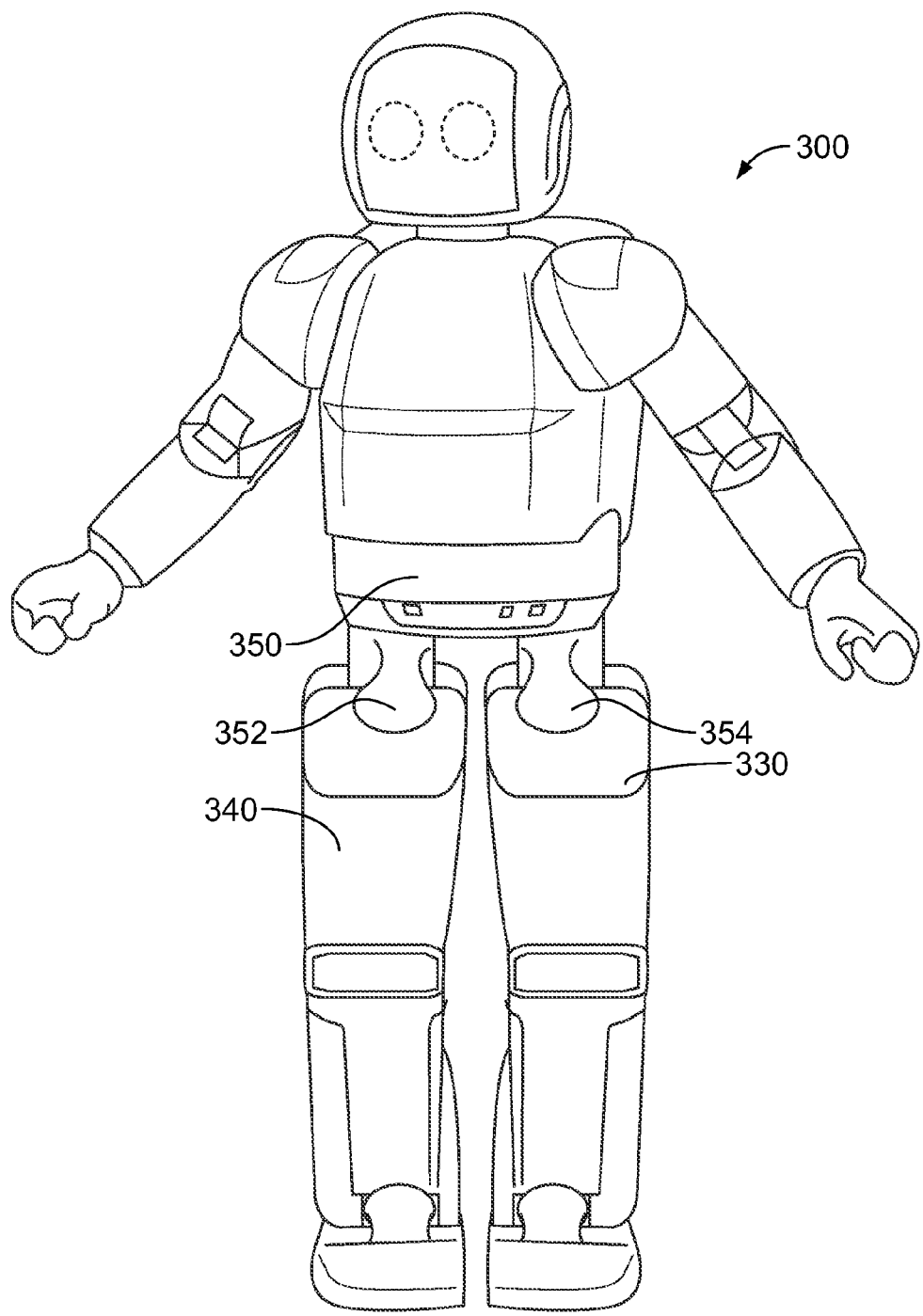
FIG. 8 is a front view of humanoid robot 300.

FIG. 8 is a front view of humanoid robot 300 that includes a pelvis area 350 and legs 330, 340, which is another example of a humanoid robot that does not include relative rotation between a pelvis structure and a back member at a pelvis level. Rather, humanoid robot 300 utilizes a spherical ball and socket assembly 354 to connect the first leg 330 to the pelvis are 350, and utilizes a spherical ball and socket assembly 352 to connect the second leg 340 to the pelvis area 350, and is an example of how the commonly used spherical ball and socket assemblies may be used to connect the legs to the pelvis area of a humanoid robot.

III. EXAMPLE METHOD OF CAUSING MOVEMENT OF HUMANOID ROBOT ASSEMBLIES

Figure 9:
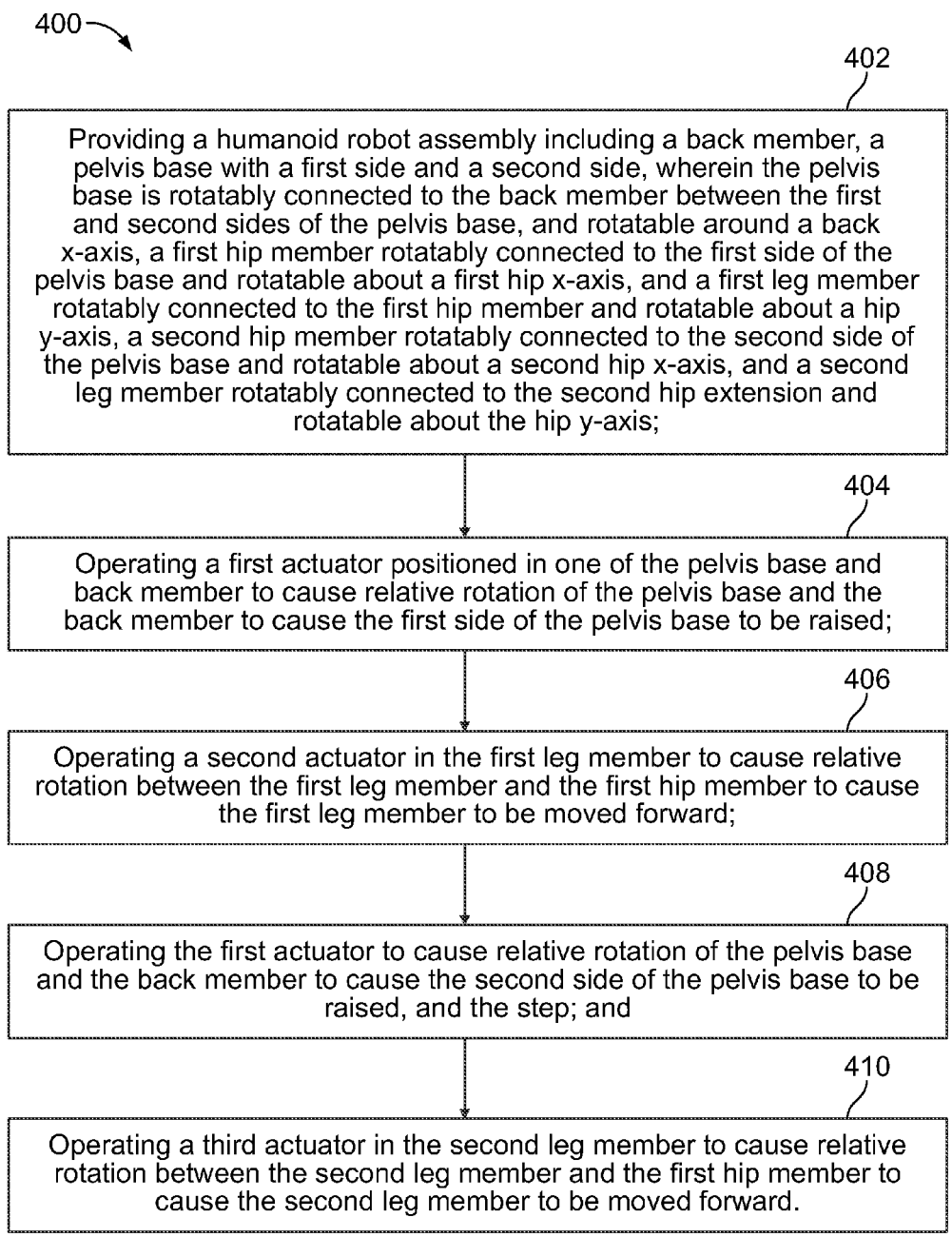
FIG. 9 is a flowchart showing method 400.

FIG. 9 shows a method 400 that may be used to cause movement of a humanoid robot assembly, including the step 402 of providing a humanoid robot assembly including a back member, a pelvis base with a first side and a second side, wherein the pelvis base is rotatably connected to the back member between the first and second sides of the pelvis base, and rotatable around a back x-axis, a first hip member rotatably connected to the first side of the pelvis base and rotatable about a first hip x-axis, and a first leg member rotatably connected to the first hip member and rotatable about a first hip y-axis, a second hip member rotatably connected to the second side of the pelvis base and rotatable about a second hip x-axis, and a second leg member rotatably connected to the second hip extension and rotatable about a second hip y-axis.

Method 400 further include step 404 of operating a first actuator positioned in one of the pelvis base and back member to cause relative rotation of the pelvis base and the back member to cause the first side of the pelvis base to be raised, and the step 406 of operating a second actuator in the first leg member to cause relative rotation between the first leg member and the first hip member to cause the first leg member to be moved forward. Method 400 further includes the step 408 of operating the first actuator to cause relative rotation of the pelvis base and the back member to cause the second side of the pelvis base to be raised, and the step, and the step 410 of operating a third actuator in the second leg member to cause relative rotation between the second leg member and the first hip member to cause the second leg member to be moved forward.

IV. CONCLUSION

While various implementations and aspects have been disclosed herein, other aspects and implementations will be apparent to those skilled in the art. The various implementations and aspects disclosed herein are for purposes of illustration and are not intended to be limiting, with the true scope being indicated by the following claims.

We claim:
1. A robot assembly comprising:
a back member;
a pelvis base with a first side and a second side; wherein the pelvis base is rotatably connected to the back member between the first and second sides of the pelvis base, and rotatable around a back x-axis;
a first hip member rotatably connected to, and rearwardly extending from, the first side of the pelvis base and rotatable about a first hip x-axis;
a first intermediate extension rotatably connected to the first hip member at a location behind the pelvis base, and rotatable about a first hip z-axis; and
a first leg member rotatably connected to the first intermediate extension and rotatable about a first hip y-axis.
2. The robot assembly of claim 1, further comprising:
a second hip member rotatably connected to, and rearwardly extending from, the second side of the pelvis base and rotatable about a second hip x-axis;
a second intermediate extension rotatably connected to the second hip member at a location behind the pelvis base, and rotatable about a second hip z-axis; and
a second leg member rotatably connected to the second intermediate extension and rotatable about a second hip y-axis.
3. The robot assembly of claim 2, wherein the rotatable connection between the first leg member and the first intermediate extension has a greater range of motion about the first hip y-axis than the rotatable connection between the first intermediate extension and the first hip member about the first hip z-axis; and
wherein the rotatable connection between the second leg member and the second intermediate extension has a greater range of motion about the second hip y-axis than the rotatable connection between the second intermediate extension and the second hip member about the second hip z-axis.
4. The robot assembly of claim 2, wherein the first hip y-axis and the second hip y-axis are coaxial.
5. The robot assembly of claim 2, wherein the back x-axis is positioned in a plane formed by the first hip x-axis and the second hip x-axis.
6. The robot assembly of claim 2, wherein the back x-axis is positioned beneath the first hip x-axis and the second hip x-axis.
7. The robot assembly of claim 2, wherein the back x-axis extends between the top of the first leg member and the top of the second leg member.
8. The robot assembly of claim 2, wherein rotation of the pelvis base about the back x-axis has a range of at least 60 degrees.
9. The robot assembly of claim 8, wherein rotation of the pelvis about the back x-axis allows for the first leg member to straighten when the robot assembly is walking, and allows the second leg member to straighten when the robot assembly is walking.
10. The robot assembly of claim 2, wherein the top of the first leg member is forwardly rotatable past an end of the first side of the pelvis base and the top of the second leg member is forwardly rotatable past an end of the second side of the pelvis base.
11. The robot assembly of claim 1, wherein hydraulic actuators are operable to cause rotation of the first hip member about the first hip x-axis, to cause rotation of the first intermediate extension about the first hip z-axis, to cause rotation of the first leg member about the first hip y-axis, and to cause rotation of the pelvis base about the back x-axis.
12. The robot assembly of claim 1, wherein the back x-axis and the first hip x-axis are parallel to one another.
13. The robot assembly of claim 1, wherein the pelvis base is positioned in front of the back member.

14. The robot assembly of claim 1, wherein rotation of the first leg member about the first hip y-axis is at least 180 degrees.

15. The robot assembly of claim 1, wherein the first leg member is rotatable 360 degrees about the first hip y-axis.

16. The humanoid robot assembly of claim 1, wherein rotation of the first leg member about the first hip x-axis is up to 180 degrees.

17. A robot assembly comprising:
a back member;
a pelvis base with a first side and a second side; wherein the pelvis base is rotatably connected to the back member between the first and second sides of the pelvis base, and rotatable around a back x-axis;
a first hip member rotatably connected to the first side of the pelvis base and rotatable about a first hip x-axis;
a first intermediate extension rotatably connected to the first hip member and rotatable about a first hip z-axis;
a first leg member rotatably connected to the first intermediate extension and rotatable about a first hip y-axis;
a second hip member rotatably connected to the second side of the pelvis base and rotatable about a second hip x-axis;
a second intermediate extension rotatably connected to the second hip member and rotatable about a second hip z-axis; and
a second leg member rotatably connected to the second intermediate extension and rotatable about a second hip y-axis;
wherein an actuator within the back member is operable to cause relative rotation about the back x-axis between the pelvis base and the back member;
wherein an actuator positioned within the first side of the pelvis base is operable to cause relative rotation about the first hip x-axis between the first side of the pelvis base and the first hip member, and an actuator positioned within the second side of the pelvis base is operable to cause relative rotation about the second hip x-axis between the second side of the pelvis base and the second hip member;
wherein an actuator positioned within the first hip member is operable to cause relative rotation about the first hip z-axis between the first hip member and the first intermediate extension, and an actuator positioned within the second hip member is operable to cause relative rotation about the second hip z-axis between the first hip member and the second intermediate extension; and
wherein an actuator positioned within the first leg member is operable to cause relative rotation about the first hip y-axis between the first leg member and the first intermediate extension, and an actuator positioned within the second leg member is operable to cause relative rotation about the second hip y-axis between the second leg member and the second intermediate extension.

18. The robot assembly of claim 17, wherein the actuators comprise hydraulic actuators.

19. A robot assembly comprising:
a back member;
a pelvis base with a first side and a second side; wherein the pelvis base is rotatably connected to the back member between the first and second sides of the pelvis base, and rotatable around a back x-axis;
a first hip member rotatably connected to the first side of the pelvis base and rotatable about a first hip x-axis;
a first leg member rotatably connected to the first hip member and rotatable about a first hip y-axis;
a second hip member rotatably connected to the second side of the pelvis base and rotatable about a second hip x-axis;
a second leg member rotatably connected to the second hip member and rotatable about a second hip y-axis;
wherein the first leg member is also rotatable with respect to the first hip member about a first upwardly extending hip z-axis, and the second leg member is also rotatable with respect to the second hip member about a second upwardly extending hip z-axis;
a first intermediate extension rotatably connected to the first hip member and rotatable about the first hip z-axis;
a second intermediate extension rotatably connected to the second hip member and rotatable about a second hip z-axis;
wherein the top of first leg member is rotatably connected to the first intermediate extension, with the top of the first leg member rotatable with respect to the first intermediate extensions about the first hip y-axis; and
wherein the top of second leg member is rotatably connected to the second intermediate extension, with the top of the second leg member rotatable with respect to the second intermediate extension about the second hip y-axis; and
wherein each of the first and second intermediate extensions comprises a yoke.

20. A pelvis structure for a robot assembly, comprising:
a back member;
a pelvis base with a first side and a second side; wherein the pelvis base is rotatably connected to the back member between the first and second sides of the pelvis base, and rotatable around a back x-axis;
wherein the first side of the pelvis base is rotatably connected to a first end of a first hip member rearwardly extending from the first side of the pelvis base and rotatable about a first hip x-axis;
wherein the first hip member is adapted to be rotatably connected to a top of a first leg member, with the first leg member rotatable about a first hip y-axis extending through a top of the first leg member;
wherein the second side of the pelvis base is rotatably connected to a first end of a second hip member rearwardly extending from the second side of the pelvis base and rotatable about a second hip x-axis; and
wherein the second hip member is adapted to be rotatably connected to a top of the second leg member, with the second leg member rotatable about a second hip y-axis extending through a top of the second leg member.

21. A method of causing movement of a humanoid robot assembly, comprising: providing a humanoid robot assembly including a back member, a pelvis base with a first side and a second side, wherein the pelvis base is rotatably connected to the back member between the first and second sides of the pelvis base, and rotatable around a back x-axis, a first hip member rotatably connected to, and rearwardly extending from, the first side of the pelvis base and rotatable about a first hip x-axis, and a first leg member rotatably connected to the first hip member and rotatable about a first hip y-axis, a second hip member rotatably connected to, and rearwardly extending from, the second side of the pelvis base and rotatable about a second hip x-axis, and a second leg member rotatably connected to the second hip member and rotatable about a second hip y-axis;
operating a first actuator positioned in one of the pelvis base and back member to cause relative rotation of the pelvis base and the back member to cause the first side of the pelvis base to be raised;

operating a second actuator in the first leg member to cause relative rotation between the first leg member and the first hip member to cause the first leg member to be moved forward;

operating the first actuator to cause relative rotation of the pelvis base and the back member to cause the second side of the pelvis base to be raised; and operating a third actuator in the second leg member to cause relative rotation between the second leg member and the first hip member to cause the second leg member to be moved forward.

\* \* \* \* \*